(12) United States Patent
Um et al.

(10) Patent No.: US 6,490,408 B1
(45) Date of Patent: Dec. 3, 2002

(54) APPARATUS AND METHOD FOR DETERMINING ID INFORMATION RECORDED ON AN INFORMATION-STORED MEDIUM

(75) Inventors: Soung-Hyun Um, Kyunggido (KR); Kang-Soo Seo, Kyunggido (KR); Sung-Wan Park, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/170,034

(22) Filed: Oct. 13, 1998

(30) Foreign Application Priority Data

Oct. 28, 1997 (KR) ............................................ 97-55589
Nov. 28, 1997 (KR) ............................................ 97-63740
Dec. 11, 1997 (KR) ............................................ 97-67633

(51) Int. Cl.[7] .......................... H04N 5/91; H04N 5/781; H04N 5/85; H04N 5/90; H04N 7/167
(52) U.S. Cl. .......................... 386/94; 386/125; 725/31
(58) Field of Search ............................. 386/1, 45, 94, 386/125–126; 360/60; 380/201, 202; 713/193; 369/47.46, 47.47, 47.41; 725/31, 134

(56) References Cited

U.S. PATENT DOCUMENTS

| | | | | |
|---|---|---|---|---|
| 5,659,613 A | * | 8/1997 | Copeland et al. | 380/3 |
| 5,706,266 A | * | 1/1998 | Brownstein et al. | 369/58 |
| 5,751,676 A | * | 5/1998 | Kusano et al. | 369/50 |
| 5,754,355 A | * | 5/1998 | Nakamura et al. | 360/73.03 |
| 5,765,152 A | * | 6/1998 | Erickson | 707/9 |
| 5,809,545 A | * | 9/1998 | Ozaki et al. | 360/60 |
| 6,034,934 A | * | 3/2000 | Miyake et al. | 369/54 |
| 6,035,433 A | * | 3/2000 | Sako et al. | 714/764 |
| 6,099,408 A | * | 8/2000 | Schneier et al. | 463/29 |
| 6,119,109 A | * | 9/2000 | Muratani et al. | 705/400 |
| 6,134,662 A | * | 10/2000 | Levy et al. | 713/200 |
| 6,144,742 A | * | 11/2000 | Gotoh et al. | 380/201 |
| 6,158,005 A | * | 12/2000 | Bharathan et al. | 713/200 |
| 6,161,179 A | * | 12/2000 | Seidel | 713/168 |
| 6,240,401 B1 | * | 5/2001 | Oren et al. | 705/40 |
| 6,266,299 B1 | * | 7/2001 | Oshima et al. | 369/13 |

OTHER PUBLICATIONS

Partridge, Scott A., "DVD: Digital Versatile Disc, DVD–ROM, Divx (Digital VIdeo Express)", all pages.*

Haukap, Anthony W., "All About Divx, the latest in DVD technology" Aug. 16, 1999, all pages.*

* cited by examiner

Primary Examiner—Andrew Christensen
Assistant Examiner—Po-lin Chieu
(74) Attorney, Agent, or Firm—Birch, Stewart, Kolasch & Birch, LLP

(57) ABSTRACT

A method and apparatus for controlling remote reproduction of an information-stored medium in a reproduction apparatus including a reproduction unit for reproducing the information-stored medium in which an identification (ID) information is recorded in constant angular velocity (CAV) drive mode, and an external device for communicating with a remote server for playback permission of the information-stored medium. CAV rotating speed information is transmitted from external device to the reproduction unit. ID information is read while servo-controlling the rotation of the information-stored medium based on the transmitted CAV rotating speed information.

2 Claims, 7 Drawing Sheets

APPARATUS AND METHOD FOR DETERMINING ID INFORMATION RECORDED ON AN INFORMATION-STORED MEDIUM

BACKGROUND OF THE INVENTION

1. Field of the Invention

The present invention relates generally to a reproducing apparatus for a remote rental system, and more particularly to a reproducing apparatus for enabling a remote rent of video titles, comprising an information-stored medium on which video information such as movies is stored together with a unique ID code; a player for reproducing the data on the information-stored medium; and an external device which communicates with a remote server and processes the data read out from the information-stored medium.

2. Brief Description of the Prior Art

A digital video disc (DVD) is the next generation of compact disc media that is capable of recording a large amount of digital information of about 5 GB on one side of the disc, even if DVD has the same diameter of 12 cm as CD. The DVD's larger capacity is due to the enhancement of aiming and focusing mechanisms and recording density, and so on. Since a 135-minute movie fits on the DVD if it is compressed in MPEG-2 format, the DVD is expected to replace a magnetic video tape and CD.

A general optical disc player converts the compressed video and audio data on the CD or the DVD into high-quality video and CD-quality audio for output to TVs and stereo systems.

FIG. 1 depicts a block diagram of a conventional optical disc player. It includes an optical disc 1 which contains audio and/or video data; and optical pickup/servo-controller 3 for reading out the audio/video data; a disc controller for controlling the rotation of the disc for accurate read-out operation; a data buffer 5 for temporarily storing the data read out by the optical pickup 3; an audio/video signal processor 9 for converting the data in the data buffer 5 to an output video/audio signal to an external displayer or display unit 11 such as a TV or monitor; and a micro control unit (MCU) 7 for controlling the operations of the audio/video signal processor 9, the optical pickup/servo-controller 3, and the data buffer 5.

The reproduction operation of the optical disc player configured as above is as follows. The data read out from the optical disc 1 by the optical pickup 3 are temporarily stored in the data buffer 5 and are then fed to the digital signal processor 9. The digital signal processor 9 outputs them after signal processing and decoding. The MCU 7 controls overall processes from the read-out operation by the optical pickup 3 to audio/video signal decoding by the digital signal processor 9.

Even though the optical disc player has several advantages, its market has not grown rapidly yet. Considering big rental markets of movies, education, and music video titles of magnetic video tape or CD, it is probable that the DVD titles will be distributed for rental as well as for sales. Current video tape rental systems, however, have several inconveniences to both customers and retailers. First, customers have to return the rented video tapes in the rent period regardless of viewing the rented video tapes. And they have to visit the video stores to return the video tape.

Moreover, even if customers desire to keep good video titles, the current video tape rental system does not satisfy the customers' needs completely. On the other hand, retailers and producers have to try to prevent theft of video titles at the rental shop as well as unauthorized copying of the video titles. Moreover, if the unauthorized copying happens, it is impossible to trace which the video tapes are used in the unauthorized copying because the tapes do not have their own ID information.

Especially, because the quality of the DVD titles does not deteriorate even if they are copied too many times, more care must be taken to prevent the unauthorized copying. The retailers have to check the status of the video titles continually.

Video on demand (VOD) system may solve the above mentioned problems, but in the VOD system huge amount of video information must be transmitted over the public phone line, which is still technically challenging.

SUMMARY OF THE INVENTION

It is a primary objective of the present invention to solve the above mentioned problems of the conventional video title rental system and to provide a reproducing apparatus, which is composed of an information-stored medium requiring remote playback permission, a player for the information-stored medium, and a communication device, for enabling a remote rental system, thereby allowing customers to keep the information-stored medium and offering advertisements to customers continuously.

The apparatus according to the present invention comprises an information-stored medium on which data are contained together with an ID code; a player which reproduces the data on the information-stored medium; and an external device which communicates with a remote central server for playback permission and processes the data that are read out from the information-stored medium after playback permission. With the apparatus, customers can purchase the information-stored medium at a low cost, use the medium whenever they want, and never return it.

For the player enabling the remote rental system in accordance with the prevent invention, there is the effect of allowing customers to keep the information-stored medium at a lower cost than purchase general information-stored medium titles, not to visit to the title rental stores to return it after an initial use period is completed, and to use them again whenever they want.

It is possible to reduce the overload of the public communication network because the data related only to playback permission are transmitted over the communication network. Due to the apparatus of the present invention, public and commercial advertisements are provided to customers continually over the communication network. Moreover, the unauthorized copying of the information-stored medium is prevented or reduced by monitoring the unique ID information, thereby protecting the title producer's and retailer's interests.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

The reproducing apparatus for a remote rental system according to the present invention will be described in detail referring to the accompanying drawings.

Figure 1:
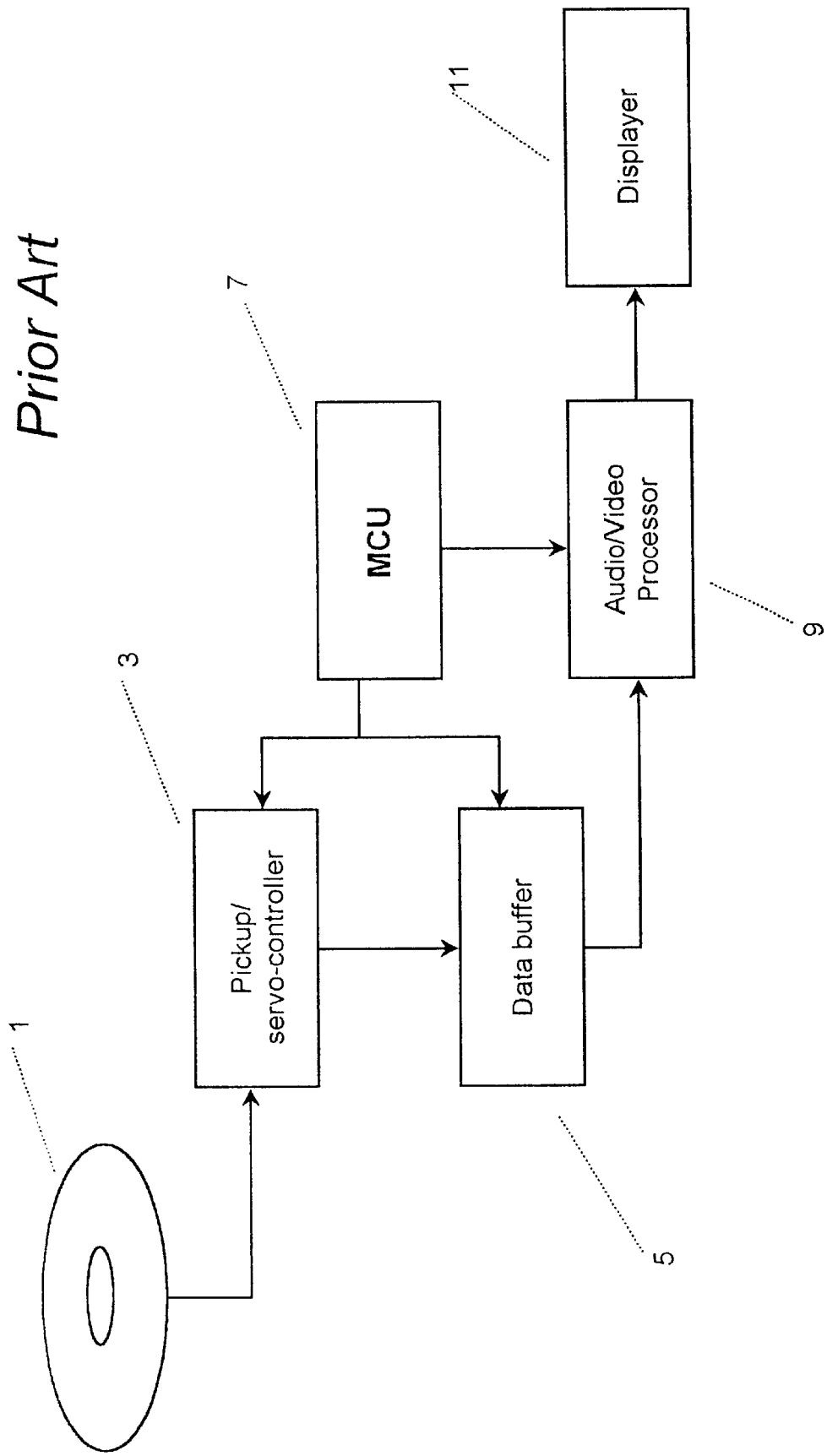
FIG. 1 is a schematic diagram of a conventional optical disc player.
Figure 2:
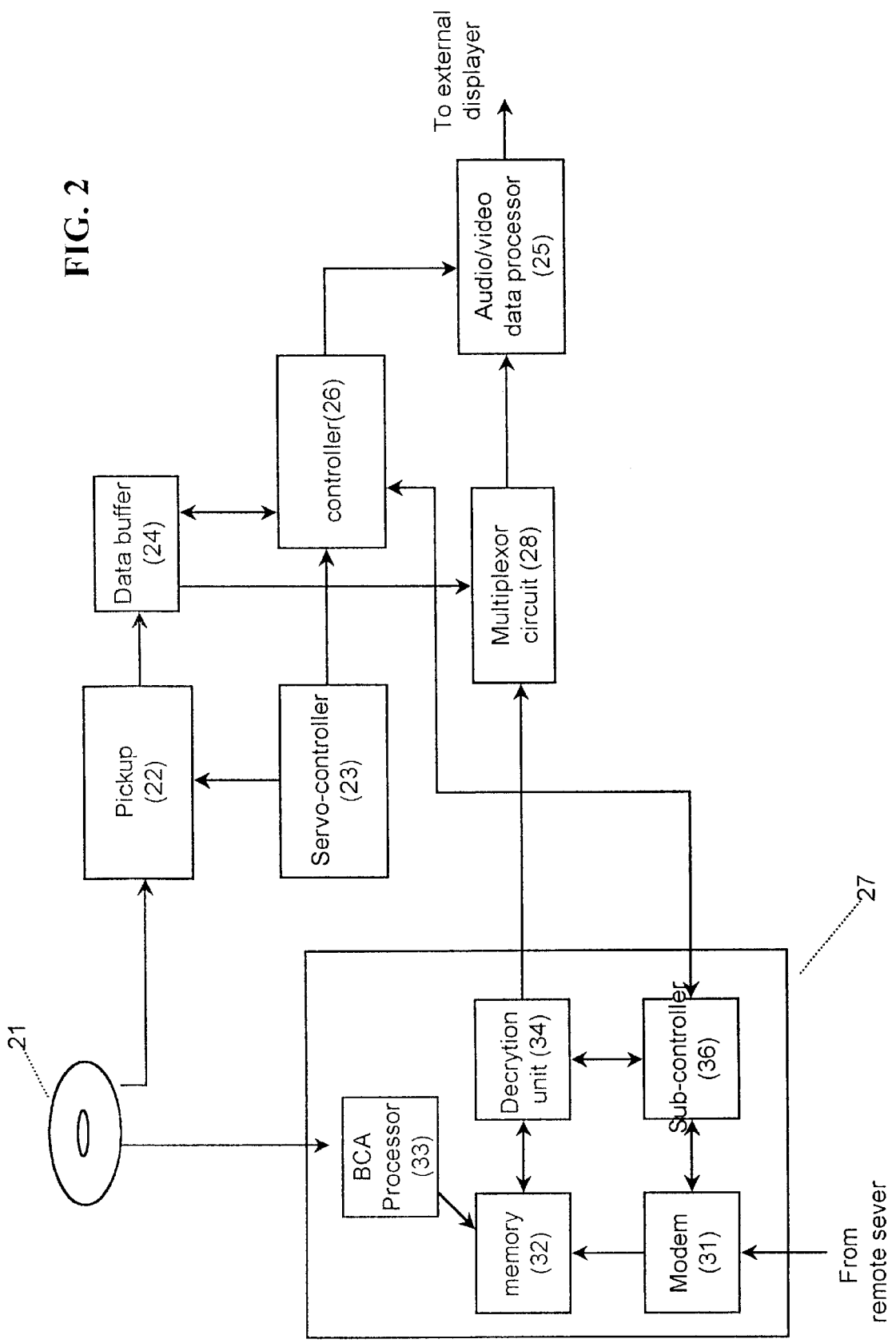
FIG. 2 is a schematic diagram of a reproducing apparatus enabling a remote rental system according to the present invention.

Referring to FIG. 2, there is shown an embodiment of reproducing apparatus according to the present invention, comprising an information-stored medium 21 on which audio and/or video information is recorded; an optical pickup 22 which reads out the data on the information-stored medium 21; a servo control unit 23 which controls the rotation of the information-stored medium 21 and the position of the optical pickup 22; a data buffer 24 in which the data read out from the information-stored medium 21 by the optical pickup 22 are temporarily stored; an audio/video signal processor 25 which processes and decodes the data that are outputted from the data buffer 24; a controller 26 which controls the operations of the servo control unit 23 and the audio/video signal processor 25; an external device 27 which communicates with a remote central server for playback permission and processes the data read out from the information-stored medium 21 after the playback permission; and multiplexor (MUX) circuit 28 which routs one of the data from the external device 27 and the data from the data buffer 24 to the audio/video signal processor 25.

As shown in FIG. 2, an embodiment of the external device 27 comprises a modem 31 for communicating with the remote central server; a memory 32 for temporary storage of the data that are received from the modem 31; a BCA processor 33 for processing the unique ID code on the information-stored medium 21; a decryption unit 34 for decrypting the audio/video data from the information-stored medium 21; a sub-controller 36 for controlling all components of the external device 27 and the overall operation by communication with the controller 26.

The control method of the reproducing apparatus configured as above is as follows. Once the information-stored medium 21 is loaded in the apparatus, the apparatus determines whether or not the medium is an information-based medium requiring remote playback permission. This is done by checking the existence of a prescribed directory in the root directory on the information-stored medium. Once the type of the information-stored medium is identified based on the determination result, the controller 26 sends information on the medium type to the sub-controller 36 so that the sub-controller 36 determines whether to establish a communication path between the external device and the remote central server.

Even when it is determined that the loaded medium is not the information-stored medium requiring the remote permission, the information about the medium type should be sent to the sub-controller 36 to guarantee that the external device 27 operates independently without waiting the command of the controller 26. Furthermore, the determination and sending of the information about the medium type are made when the information-stored medium is ejected or when there is no information-stored medium loaded. This is because the type of information-stored medium may be changed and/or the information-stored medium may be ejected when a tray is open. In this way, the external device 27 can maintain the state that is linked to the operation condition of the information-stored medium player.

Basically, the information-stored medium requiring remote playback permission is controlled and reproduced in a general DVD playback environment. Therefore, when a DVD is loaded that is not designed for remote playback permission, the communication path between the controller 26 and the sub-controller 36 is established. In the case that the information-stored medium loaded is neither a DVD nor an information-stored medium for the remote playback permission, the controller 26 sends information on the type of the loaded medium to the sub-controller 36 and cuts off the communication path so that the external device 27 operates independently under control of the sub-controller 36.

When it is determined that the information-stored medium requiring remote playback permission is loaded, first, the player reads out a unique ID information that is recorded on the information-stored medium. Every information-stored medium requiring remote playback permission has its own unique ID information that is recorded in a particular way so as to allow the remote server to identify each information-stored medium.

To be specific, unlike the data area on DVD information-stored medium in which data are recorded in constant linear velocity (CLV) drive mode, the ID information is recorded in constant angular velocity (CAV) drive mode at an inner area than the innermost track of the data area of the information-stored medium in the form of a bar-code.

Therefore, in order to read out the ID information, the player according to the present invention uses a different read-out mode from the read-out mode for the data area on the DVD information-stored medium. Specifically, the optical pickup 22 is moved inwards more than the innermost track to the area on which the ID information is recorded and, at the same time the information-stored medium is rotated in CAV mode so as to read out the ID information correctly.

In order to prevent general DVD players from reading out the ID information, information on the CAV drive mode is kept in the external device 27. The rotation of the information-stored medium is servo-controlled based on the CAV information, which is transmitted from the external device 27.

In short, if it is determined that the information-stored medium inserted is one requiring remote playback permission, the player sends the information on the medium type to the external device 27. Once receiving the information, the external device 27 sends a signal that requests read-out of the ID information on the information-stored medium to the player, together with information on CAV drive mode. Then, the player reads out the ID information by servo control of the rotation of the information-stored medium on the basis of the CAV drive information.

The ID information is absolutely required to request permission of playback of the information-stored medium. In order to reduce read-error of the ID information, the read-out operation by the optical pickup is repeated in such a way that rotation per minute(RPM) of the information-stored medium is adjusted step-by-step until an RPM difference between the actual rotation of the information-stored medium and the CAV information received from the external device 27 falls into an allowable RPM error range. The RPM of the information-stored medium is servo-controlled in such a way that the required RPM error range depends on information on the total number of previous trials of the ID information read-out.

To be more specific, the ID information is read out from the information-stored medium when the RPM difference between the CAV information transmitted from the external device 27 and the actual RPM falls into the RPM error range, which is determined by information on the number of previous read-out trials including the current trial. Initially, a wide RPM error range is used for rapid read-out of the ID information, but as the read-out operation of the ID information is repeated, the RPM error range gets narrower.

Therefore, besides the request signal for read-out of the ID information and the CAV drive information, the external device 27 transmits information on the trial number of the read-out operation to the player. On receiving them, the player reads out the ID information by servo control of the rotation of the information-stored medium according to the CAV drive information and the iteration number.

After the ID information on the information-stored medium is read out, the BCA processor 33 in the external device 27 extracts an ID number of the information-stored medium through signal processing of the ID information and then requests permission of the playback of the information-stored medium by transmitting the ID number to the remote server through the modem 31.

The operations of the external device 27 and the player depends on whether or not the request signal for the playback permission is provided by the external device 27, which will be described in detail.

First, in the case that an acknowledge signal is received from the remote server in response to the request of the playback permission, the controller 26 in the player drives the optical pickup 22 so that the data on a specified area of the information-stored medium are read out.

The data on the information-stored medium requiring the remote playback permission are recorded, encrypted by two encryption schemes. Some data are encrypted with the same encryption scheme as that in a general DVD, and the other by a specific encryption scheme which is developed for this type of information-stored medium. Therefore, before playback of the data read out, some portion of the data, which are encrypted by the specific encryption scheme, are sent to the decryption unit 34 in the external device 27. The decryption unit 34 decrypts the received data on the basis of decryption information which can be transmitted from the remove server or read out from the information-stored medium.

The decryption unit 34 uses different decryption schemes, depending on the type of the data that are read out from the information-stored medium. For example, in the case of audio/video or sub-picture data, decryption is made, but not in the case of control data such as navigation data for real-time playback control.

The data decrypted by the decryption unit 34 are temporarily stored in the memory 32 and are then transmitted to the audio/video signal processor 25. Then, they are processed and decoded by the audio/video signal processor 25 and are outputted to the external display unit.

On the other hand, in cases where the external device 27 does not request remote playback permission, the reproducing apparatus according to the present invention can display useful information for users or advertisements of new information-stored medium titles through communication between the remote server and the external device 27. In the case, the operations of the external device 27 and the player are described below.

When the external device 27 receives a signal indicating the transmission of information from the remote server, the sub-controller 36 in the external device 27 stores the information in the memory 32 temporarily, and then sends the information to the MUX circuit 28 after permission of the controller 26 is made, so that the audio/video signal processor 25 processes the information for output to the display unit.

Figure 3:
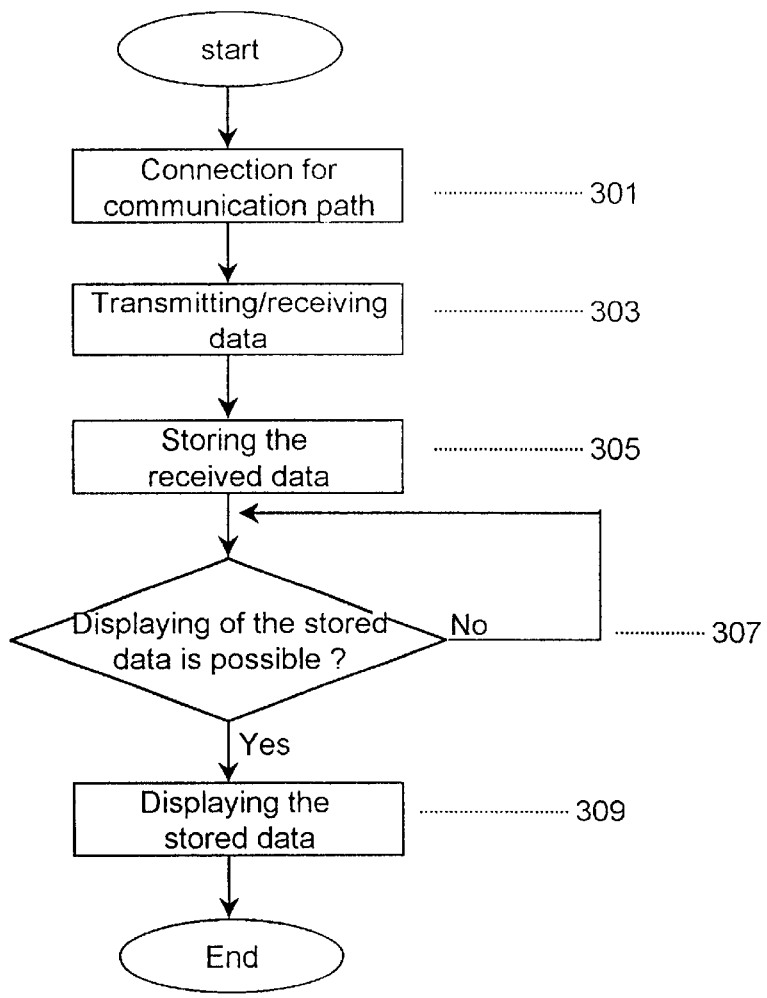
FIG. 3 is a flow chart of receiving and displaying information from a remote server according to the present invention.

FIG. 3 shows a flow chart of the operations for receiving and displaying public and commercial advertisements from the remote server in the reproducing apparatus according to the present invention.

Even when main power of the apparatus is off, both the controller 26 of the player and the sub-controller 36 of the external device 27 are maintained in ON state for communicating with the remote server. In other words, some portion of the apparatus such as the modem 31, the controller 26, the sub-controller 36, and the external memory 32 are in the ON state so that the apparatus receives/transmits data from/to the remove server.

When it is necessary for the remote server to send information such as advertisements to users, first, the server sends a signal to the sub-controller 36 through the modem 31 to confirm whether or not the apparatus is in the state in which data communication is possible. If the sub-controller sends an acknowledge signal in response to the request signal, a communication path is established (STEP 301 in FIG. 3).

Basically, the establishment of the connection between the external device 27 and the remove server is allowed only when a user does not use the player so as to avoid an overload of the player that may happen when a large amount of data are received at a time otherwise.

Once the communication path is established, the remove server transmits the data to the apparatus over the communication path and then the external device 27 receives them (STEP 303 of FIG. 3).

The data which are received through the modem 31 are stored in the memory 32. The capacity of the memory 32 is large enough to accommodate the amount of the data that are usually transmitted from the remove server. Moreover, the write operation into the memory 32 is controlled such that the data which are received since overflow overwrite the previously stored data (STEP 305 of FIG. 3).

When a user turns on the player, the data which have been stored in the memory 32 are displayed in the following way. Once the player turns on, power is supplied to components that are needed to play a information-stored medium by the controller 26 and then a set-up operation for playback starts.

During the time of the set-up operation, the sub-controller 36 checks whether or not the player can display the data in the memory 32 by communication with the controller 26 (STEP 307 and FIG. 3).

Specifically, the sub-controller 36 requests the use of the data buffer 24 and the audio/video signal processor 25 under supervision of the controller 26.

On receiving the request signal from the sub-controller 36, the controller 26 stops the operation that is running in the audio/video signal processor 25 and clears the data stored in an internal memory (not shown) of the audio/video signal processor 25 so as to avoid decoding conflict due to the remained data. In addition, the controller 26 sends a signal indicating the data transmission from the external device 27 to the audio/video signal processor 25. When the series of operations is completed and thus the player comes to be in the state for receiving the data, the controller 26 sends an acknowledge signal to the sub-controller 36.

After obtaining a permission of the data transmission from the controller 26, the sub-controller 36 transmits the data in the memory 32 to the player. And then, the data are transmitted to the audio/video signal processor 25 for digital signal processing and decoding and are then outputted to TV or monitor (STEP 309 of FIG. 3).

When the controller 26 permits the data transmission from the external device 27 is determined by the controller 26. For example, The data transmission may be permitted during only the set-up period right after power-on of the player.

In this case, the video data of several frames that are received from the remove server and stored in the memory 32 are displayed during the set-up period, thereby enabling users to view information such as advertisements instead of waiting display of the video data from an information-stored medium in the player.

The transmission of data block of arbitrary size may be permitted in the middle of reproduction of the information-stored medium by a prescribed amount according to a predetermined program.

Furthermore, in the case that a DVD contains several titles, the data transmission may be allowed during each period of time which is required to play the next title. When a user inputs a command for viewing the data received from the remove server, of course, the controller 26 requests the transmission of the data stored in the external device 27 to the sub-controller 36 immediately.

In short, if only the display of the data that are received from the remote server does not interfere with the playback of the information-stored medium in the player, it is possible for the data to be reproduced in the player anytime.

Figure 4:
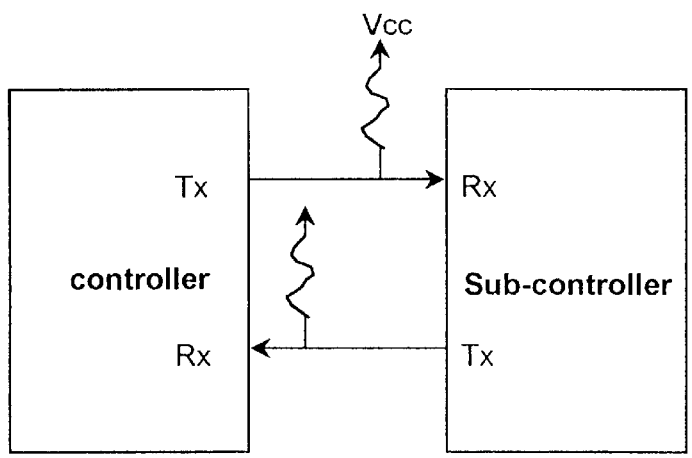
FIG. 4 is a schematic diagram showing a communication protocol between a controller and a sub-controller.

FIG. 4 is a schematic diagram showing a two-wire serial communication link embodying a communication between the controller 26 and the sub-controller 36, which will be explained in detail in reference to FIG. 2.

The input port Rx/the output port Tx of the controller 26 are connected to the output port Tx/the input port Rx of the sub-controller 36, respectively. Therefore, the data from the output port Tx of the controller 26 are inputted to the input port Rx of the sub-controller 36, and the data from the output port Tx of the sub-controller 36 are inputted to the input port Rx of the controller 26. The data are transmitted serially by 8-bit or 16-bit unit.

The data communication between the controller 26 and the sub-controller 36 shown in FIG. 4 can be accomplished in parallel mode by connecting data lines between two controller 26 and 36 as much as the bits of single data.

In the configuration shown in FIG. 4, the controller 26 and the sub-controller 36 communicate each other in the following way. Before transmitting the data in the memory 32 to the player, the sub-controller 36 sends a check signal through the output port Tx to the controller 26 to confirm whether the controller 26 can receive the data from the external device 27. On receiving the check signal through the input port Rx, the controller 26 checks the status of the MUX circuit 28 and the audio/video signal processor 25, and sends a signal that notifies whether or not the MUX circuit 28 and the audio/video signal processor 25 are available to the sub-controller 36.

If the sub-controller 36 receives the signal that notifies a permission of the data transmission through the input port Rx, the data stored in the memory are transmitted to the controller 26 by the sub-controller 32.

Figure 5:
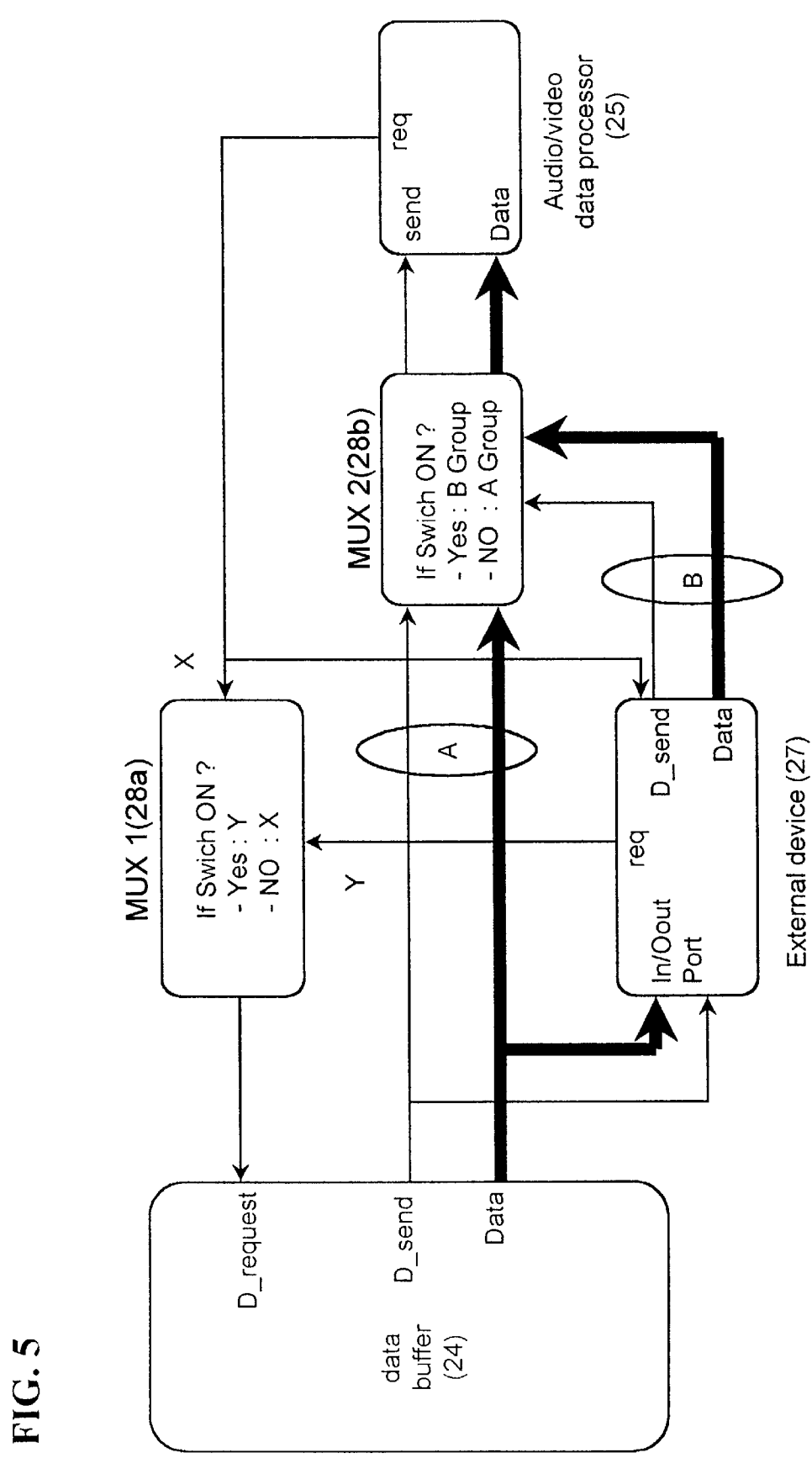
FIG. 5 is a schematic diagram showing data paths and the signal I/O of the components on the data paths at the time of reproduction of an information-stored medium.

FIG. 5 is a schematic diagram showing data path and control signal path of the components at the time of reproduction of the information-stored medium requiring remote playback permission.

As shown in FIG. 5, the data buffer 24 and the external device 27 are connected to the audio/video signal processor 25 by way of the MUX circuit 28, whose function is to select one of the data from the data buffer 24 and the data from the external device 27 and to output the selected data to the audio/video signal processor 25.

The MUX circuit 28 comprises a MUX 28a for transmitting a data transmission request signal from the audio/video signal processor 25 or the external device 27 to the data buffer 25; and a MUX 28b for transmitting one of the data supplied from the external device 27 and the data from the data buffer 25 to the audio/video signal processor 25.

It is desirable that the multiplexors 28a and 28b are implemented by one switching element and thus they operates on the same state. When the MUX 28a is ON the transmission request signal from the external device 27 is sent to the data buffer 24, and at that time, because the MUX 28b is ON as well, the data from the external device 27 are selected and sent to the audio/video signal processor 25. Conversely, when the MUX 28a is OFF, the request signal from the audio/video signal processor 25 is directly sent to the data buffer 24 and because the MUX 28b is OFF as well, the data from the data buffer 24 are sent to the audio/video signal processor 25.

The operation of the MUX 28a and MUX 28b for reproducing the information-stored medium requiring remote playback permission is controlled by the controller 26. To be specific, the sub-controller 36 of the external device 27 requests for the transmission of the data on the information-stored medium to the controller 26. On receiving the request signal, the controller 26 sets the MUX 28a ON to enable the transmission request signal from the external device 27 to be sent to the data buffer 24, and generates a command signal to request of clearing some data that may remain in the data buffer 27. The reason of clearing the remained data in the data buffer 27 is to prevent the remained data from being outputted to the audio/video signal processor 25. The remained data have discontinuity with data read out from the medium, so that the remained data causes malfunction of the audio/video signal processor 25 while decoding the input data streams.

For the same reason, before the data stored in the data buffer 24 are transmitted to the external device 27 over the established communication path, the data that have remained in the memory 32 of the external device 27 are cleared to avoid the conflict in the decoding operation due to the remained data.

Figure 6:
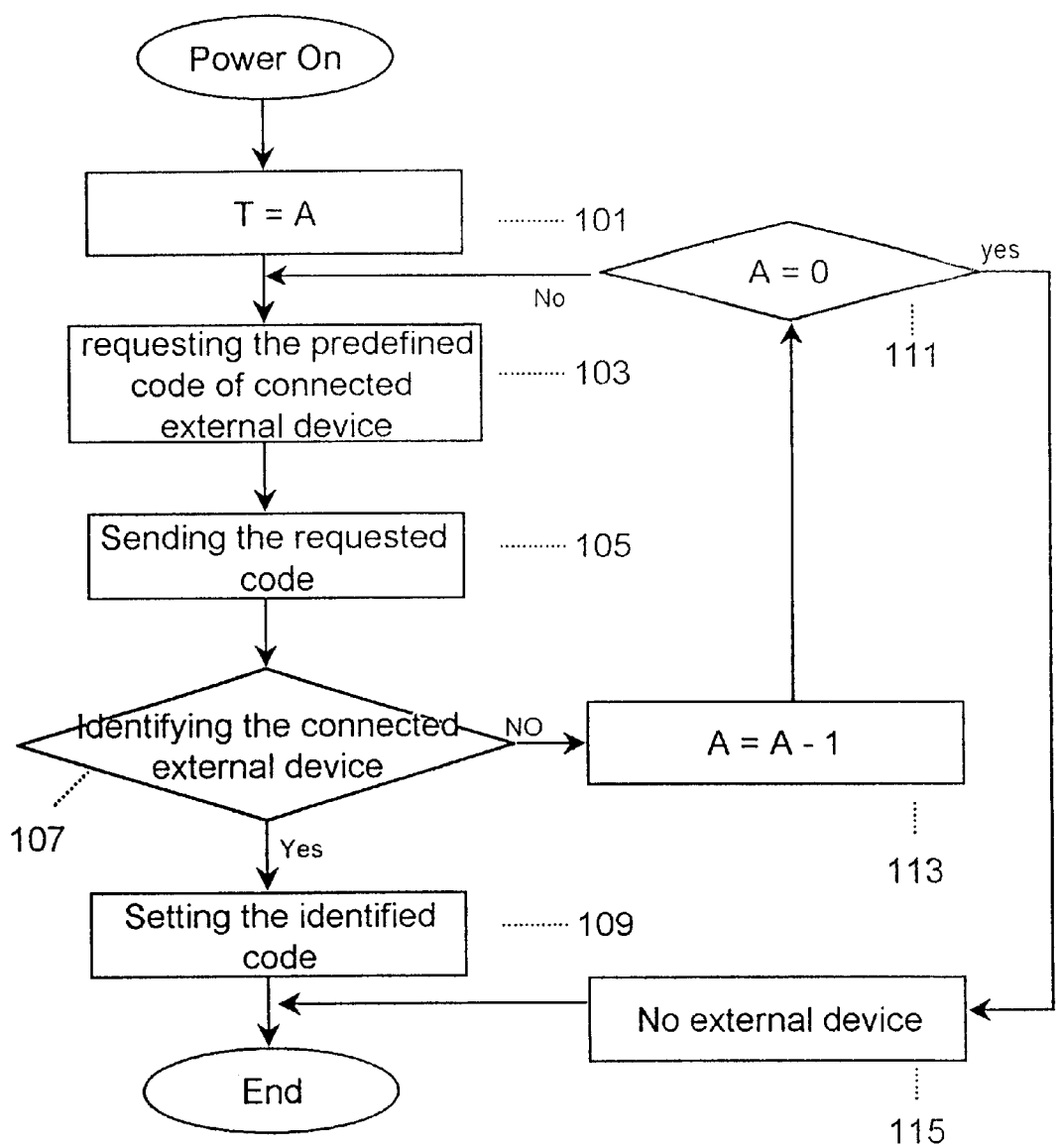
FIG. 6 is a flow chart of determining whether or not the player enabling remote playback control is equipped with an external device.

FIG. 6 shows a flow chart of a method for determining whether or not the reproducing apparatus according to the present invention is equipped with an external device 27 and the type of the external device, if it is connected. The confirmation of the connection is based on the communication method between the controller 26 and the sub-controller 36 as shown in FIG. 4.

Once a user powers on the reproducing apparatus, the controller 26 sets the period of time in which the procedure of FIG. 6 is repeated to check whether the apparatus is equipped with the external device 27 (STEP 101). The reason why the STEP 101 is needed is due to delayed or no response of the external device 27 that may happen because of incomplete set-up. Instead of timer setting, the number of trial of the procedure can be used.

The controller 26 sends a signal to the sub-controller 36 through the output port Tx to identify which type of external device is connected (STEP 103). And then, the controller 26 and the sub-controller 36 send and receive a predefined code each other through their own input/output ports Rx, Tx (STEP 105). The controller 26 examines the type of the external device based on the received the code (STEP 107). If the code is not sent to the controller 26, the controller 26 cannot identify the type of the external device. This may be due to no external device or delayed response.

In this case, the controller 26 decreases the timer's value that was set in the STEP 101 by 1 second (STEP 113) and then examines whether the remained time is zero or not (STEP 111). If it is zero, the controller 26 determines that there is no connected external device (STEP 115). When it is determined that there is no external device or the information-stored medium in the player is not information-stored medium requiring remote playback permission, the controller 26 makes the MUX 28a and the MUX 28b turn OFF to maintain the data path only from the data buffer 24.

When the controller 26 receives the predefined code of the external device from the sub-controller 36, it determines the type of the connected external device based on the received code and uses the code for controlling the operations of data communication with the sub-controller 36 and signal processing of the data reproduced from the information-stored medium (STEP 109).

Figure 7:
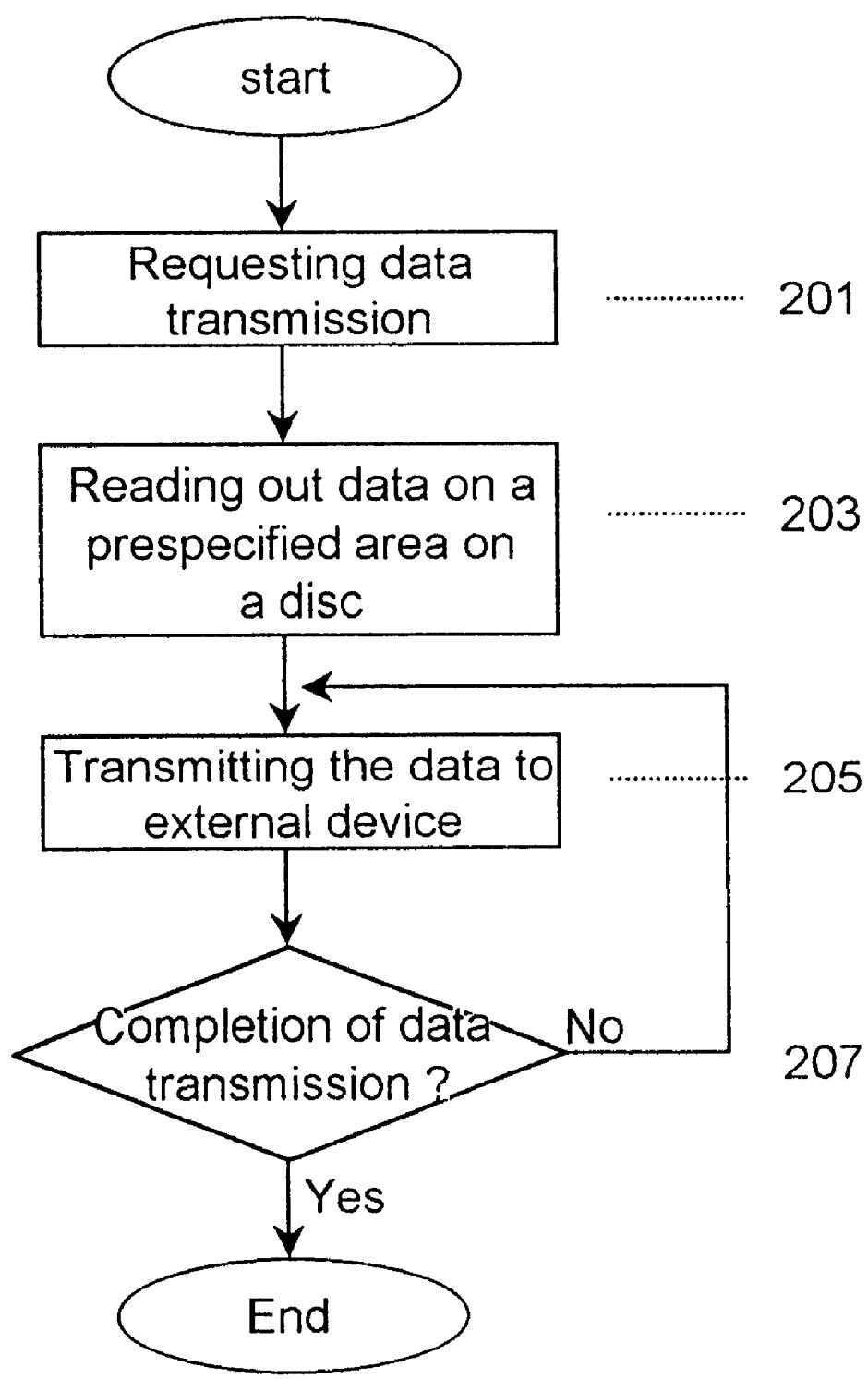
FIG. 7 is a flow chart of transmitting the data that are recorded on a prescribed area of an information-stored medium requiring remote playback permission to an attached external device.

FIG. 7 is a flow chart for transmitting the data that are recorded on a pre-specified area of the information-stored medium requiring the remote playback permission to the external device 27. In the case where the information-stored medium needs the remote playback permission, the external device 27 requires information needed to process the data that are read out from the information-stored medium 21. Because the data containing the information are recorded on a prescribed area on the information-stored medium 21, the sub-controller 26 of the external device 27 sends a signal to the controller 26 to read out the data on the information-stored medium, along with location information on the prescribed area or a predetermined file (STEP 201).

Once the controller 26 receives the signal, it controls the optical pickup 22 to move the pre-specified area on the basis of the location information or the file name that the sub-controller sent. The location information on the prescribed area may be sent to the controller 26 in the form of sector numbers. In the case, the start and end sector numbers are used to locate the prescribed area on the information-stored medium 21. On the other hand, when the file name is sent to the controller 26, the controller 26 reads out the file location information from the information-stored medium 21 and then uses the start and end sector numbers of the file to read out the file (STEP 203).

The data that are read out by the optical pickup 22 are transmitted to the input port Rx of the sub-controller 36 by way of the data buffer 24. In order to avoid the unwanted display and/or decoding conflict due to the data that remains in the data buffer 24, the data in the data buffer 24 are cleared by the controller 26 before the data transmission (STEP 205).

The transmission in the STEP 205 is maintained until all of the data on the prescribed area or the file are transmitted to the sub-controller 36.

Figure 8:
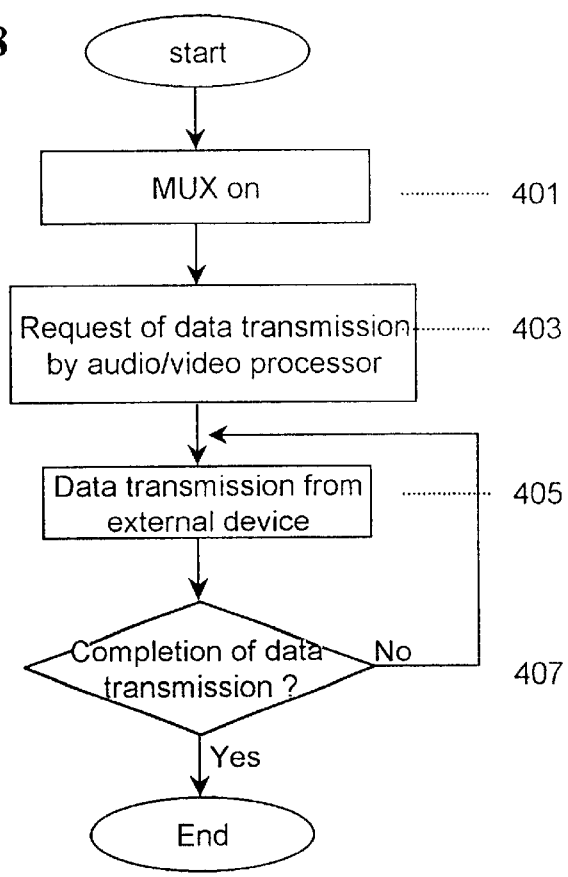
FIG. 8 is a flow chart of processing the data that are stored in an internal memory of an external device in an audio/video signal processor.

FIG. 8 is a flow chart of processing in the audio/video signal processor 25 of the reproduction data, in the MPEG format or in other format which is decodable in this player, that are transmitted from the external device 27.

First, if the sub-controller 36 sends a signal signifying that the data stored in the memory 32 are transmitted to the player to controller 26, the controller 26 examines whether or not the MUX circuit 28 and the audio/video signal processor 25 are available.

If it is determined that they are available, the controller 26 makes the MUX circuit 28 turn ON so that the data path from the external device 27 to the player is established (STEP 401). In addition, the controller 26 identifies the type of the data to be transmitted through communication with the sub-controller 36 and controls the audio/video signal processor 25 to prepare for processing according to the data type.

Specifically, on receiving the request signal from the sub-controller 36, the controller 26 stops the operation that runs in the audio/video signal processor 25 and clears the data that may remain in an internal memory (not shown in Figure) of the audio/video signal processor 25 to prevent the decoding conflict due to discontinuity of the unwanted data. Besides, the controller 26 sends a signal indicating the data transmission from the external device 27 to the audio/video signal processor 25.

Once the set-up of the audio/video signal processor 25 for processing the incoming data is completed, the controller 26 sends an acknowledge signal indicating that the audio/video signal processor 25 is ready to the sub-controller 36 (STEP 403).

After the sub-controller 36 receives the acknowledge signal, it outputs the data that are stored in the memory 32 (STEP 405). The data are transmitted to the audio/video signal processor 25 through the MUX circuit 28 and are then processed for output to the display unit.

Figure 9:
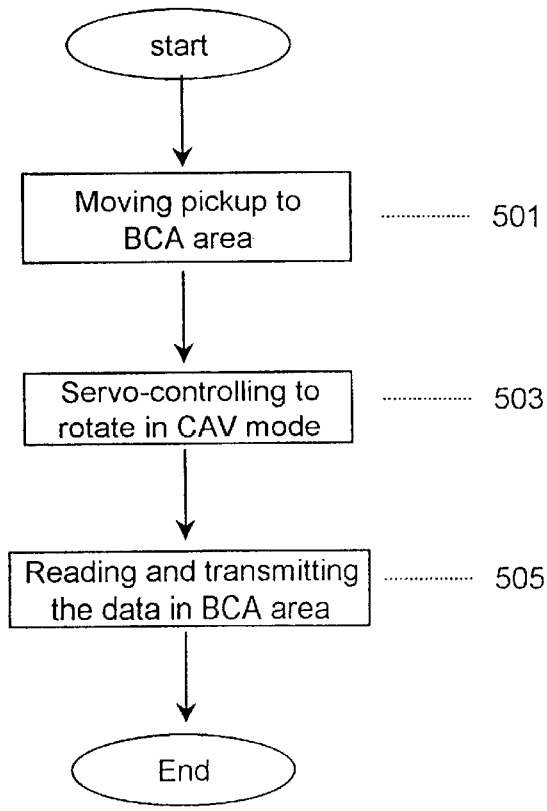
FIG. 9 is a flow chart of controlling the read-out of a unique ID information that is recorded on the information-stored medium requiring the remote playback permission.

FIG. 9 is a flow chart showing the control method for reading out a unique ID information which is recorded on the information-stored medium requiring the remote playback permission.

In general DVD players, the first operation for the DVD title playback is to read out the content management data after moving the optical pickup 22 to the correspondent area in the DVD's data area. Then, The location information of the video title which a user wants to watch is extracted from the content management data and then the audio/video data are read out based on the location information. Because general DVD titles do not require management for remote rental, the general DVD player does not need to have a mechanism to identify the DVD title.

However, the reproducing apparatus capable of reproducing the information-stored medium that needs the playback permission from the remove server according to the present invention requires a mechanism for identification of the information-stored medium. To accomplish this, the information-stored medium requiring the remote playback permission has its own unique ID information that is recorded on a prescribed area in a predetermined way. For example, the ID information is recorded in an inner area than the lead-in area in CAV drive mode rather than CLV drive mode.

When reproducing information-stored medium requiring remote playback control, first, the ID information is read out by moving the optical pickup 22 to the prescribed area and is then sent to the remote server so as to determine whether the playback of the information-stored medium is permitted or not.

The read-out of the ID information, however, needs a particular servo-control because the ID information is recorded on the information-stored medium by a prescribed way, which will be described below in detail.

If it is determined that the information-stored medium inserted is one requiring remote playback permission, the controller 26 of the player sends the corresponding information to the sub-controller 36 of the external device 27. Once receiving the information, the sub-controller 36 sends a request signal for read-out of the ID information on the information-stored medium to the controller 26 of the player.

On receiving the request signal, the controller 26 moves inwards the optical pickup 22 to an inner area, which contains the ID information of the disc, beyond the innermost track of the data area (STEP 501), and at the same time, rotates the information-stored medium in CAV drive mode to read out the ID information correctly.

In order to prevent general DVD players from reading out the ID information, information on the CAV drive mode is kept in the external device 27. In the apparatus according to the present invention, the rotation of the information-stored medium is servo-controlled based on the CAV information, which is transmitted from the external device 27 together with the request signal for the read-out of the ID information.

As a result, the player reads out the ID information on the information-stored medium by servo-control on the basis of the CAV drive information.

The ID information is absolutely required to reproduce the information-stored medium. In order to reduce read errors of the ID information that may happen, the read-out operation by the optical pickup 22 is iterated until the difference error between the CAV rotation information and actual rotation becomes zero (STEP 503).

In this case, besides the request signal for read-out of the ID information and the CAV drive information, the external device 27 transmits information on the iteration number of the read-out operation to the player. On receiving them, the player reads out the ID information iteratively by servo-controlling the rotation of the information-stored medium according to the CAV drive information and the iteration number.

After the ID information on the information-stored medium is read out, the ID information is processed by the BCA processor 33 of the external device 27 and is then sent to the remote server through the modem 31 (STEP 505). Depending on the ID information, the remote server transmits a signal indicating whether or not the playback of the information-stored medium is permitted to the controller 26 by way of the external device 27.

The foregoing is provided only for the purpose of illustration and explanation of the preferred embodiment of the present invention, so changes, variations and modifications may be made without departing from the spirit and scope of the invention.

What is claimed is:

1. A method for controlling remote reproduction of an information-stored medium in a reproduction apparatus that includes a reproduction unit for reproducing the information-stored medium in which an identification (ID) information is recorded in constant angular velocity (CAV) drive mode, and an external device for communicating with a remote server for playback permission of said information-stored medium, the method comprising the steps of:

transmitting CAV rotating speed information for reproduction of said ID information from said external device to said reproduction unit; and comparing information on an actual rotation speed of the information-stored medium rotating under servo-control in the reproduction unit with the transmitted CAV rotation speed information, and reading out said ID information when the difference of the comparison result falls within an allowable predetermined difference range, wherein the allowable predetermined difference range is determined based on the number of ID information read-out trials.

2. A method according to claim 1, wherein the step of reading out said ID information is repeated several times, depending on whether a read error of said ID information happens or not.

* * * * *